US009197669B2

(12) United States Patent
Escott et al.

(10) Patent No.: US 9,197,669 B2
(45) Date of Patent: Nov. 24, 2015

(54) APPARATUS AND METHOD FOR SIGNALING ENHANCED SECURITY CONTEXT FOR SESSION ENCRYPTION AND INTEGRITY KEYS

(75) Inventors: Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/084,378

(22) Filed: Apr. 11, 2011

(65) Prior Publication Data

US 2011/0258445 A1  Oct. 20, 2011

Related U.S. Application Data

(60) Provisional application No. 61/324,646, filed on Apr. 15, 2010, provisional application No. 61/324,991, filed on Apr. 16, 2010, provisional application No. 61/325,001, filed on Apr. 16, 2010.

(51) Int. Cl.
*H04L 29/06* (2006.01)
*H04L 9/08* (2006.01)
(Continued)

(52) U.S. Cl.
CPC ............ *H04L 63/20* (2013.01); *H04L 9/085* (2013.01); *H04W 12/04* (2013.01); *H04W 12/06* (2013.01)

(58) Field of Classification Search
CPC .................................................. H04L 63/205
USPC ........................................................ 713/168
See application file for complete search history.

(56) References Cited

U.S. PATENT DOCUMENTS

| 6,591,364 B1 * | 7/2003 | Patel .......................... 713/170 |
| 7,715,822 B2 | 5/2010 | Semple et al. |
| 7,873,163 B2 | 1/2011 | Quick et al. |

(Continued)

FOREIGN PATENT DOCUMENTS

| CN | 101232736 A | 7/2008 |
| CN | 101304600 A | 11/2008 |

(Continued)

OTHER PUBLICATIONS

3rd Generation Partnership Project (3GPP TM): "3GPP TS 33.401 V8.2.1 (Dec. 2008), 3rd Generation Partnership Project; Technical Specification Group Services and System Aspects; 3GPP System Architecture Evolution (SAE): Security Architecture", Dec. 19, 2008, 3GPP TS 33.401 V8.2.1, pp. 158, XP002574135.

(Continued)

*Primary Examiner* — Jason K Gee
(74) *Attorney, Agent, or Firm* — Darren M. Simon

(57) ABSTRACT

Disclosed is a method for establishing an enhanced security context between a remote station and a serving network. In the method, the remote station forwards a first message to the serving network, wherein the first message includes an information element signaling that the remote station supports an enhanced security context. The remote station generates at least one session key, in accordance with the enhanced security context, using the information element. The remote station receives, in response to the first message, a second message having an indication that the serving network supports the enhanced security context. The remote station, in response to the second message, has wireless communications protected by the at least one session key.

31 Claims, 6 Drawing Sheets

(51) Int. Cl.
*H04W 12/04* (2009.01)
*H04W 12/06* (2009.01)

(56) References Cited

U.S. PATENT DOCUMENTS

| | | | |
|---|---|---|---|
| 8,656,169 B2 | 2/2014 | He | |
| 2003/0088769 A1* | 5/2003 | Quick et al. | 713/169 |
| 2006/0233376 A1 | 10/2006 | Forsberg et al. | |
| 2007/0106620 A1 | 5/2007 | Khandelwal | |
| 2007/0192605 A1* | 8/2007 | Mizikovsky et al. | 713/170 |
| 2007/0230707 A1 | 10/2007 | Blom et al. | |
| 2008/0046719 A1* | 2/2008 | Kim et al. | 713/156 |
| 2008/0072047 A1 | 3/2008 | Sarikaya et al. | |
| 2008/0205650 A1 | 8/2008 | Forsberg | |
| 2008/0292099 A1 | 11/2008 | Gisin et al. | |
| 2008/0305792 A1 | 12/2008 | Khetawat et al. | |
| 2009/0258631 A1 | 10/2009 | Forsberg et al. | |
| 2009/0282253 A1* | 11/2009 | Rose et al. | 713/172 |
| 2010/0211786 A1 | 8/2010 | Lim et al. | |
| 2010/0304713 A1* | 12/2010 | Bright et al. | 455/411 |
| 2011/0255691 A1 | 10/2011 | Escott et al. | |
| 2011/0255693 A1 | 10/2011 | Escott et al. | |
| 2011/0311053 A1 | 12/2011 | Escott et al. | |
| 2015/0043734 A1 | 2/2015 | Escott et al. | |

FOREIGN PATENT DOCUMENTS

| | | |
|---|---|---|
| CN | 101385273 A | 3/2009 |
| CN | 101406024 A | 4/2009 |
| CN | 101455054 A | 6/2009 |
| CN | 101536463 A | 9/2009 |
| CN | 101606407 A | 12/2009 |
| CN | 101610147 A | 12/2009 |
| EP | 1973265 A1 | 9/2008 |
| EP | 2139260 A1 | 12/2009 |
| EP | 2205014 A2 | 7/2010 |
| JP | 2000078669 A | 3/2000 |
| JP | 2009538567 A | 11/2009 |
| JP | 2010004412 A | 1/2010 |
| JP | 2010109954 A | 5/2010 |
| KR | 20000017575 A | 3/2000 |
| KR | 20070015770 A | 2/2007 |
| KR | 20080013906 A | 2/2008 |
| RU | 2279186 C2 | 6/2006 |
| RU | 2007114028 A | 10/2008 |
| WO | 0230132 A3 | 9/2002 |
| WO | WO-2006084183 A1 | 8/2006 |
| WO | 2007111557 A1 | 10/2007 |
| WO | WO-2007114623 A1 | 10/2007 |
| WO | WO-2007139794 A2 | 12/2007 |
| WO | WO-2008048179 A2 | 4/2008 |
| WO | 2008092999 A1 | 8/2008 |
| WO | WO 2008/092999 * | 8/2008 ............ H04L 9/00 |
| WO | 2009008627 A2 | 1/2009 |
| WO | 2009020789 A2 | 2/2009 |
| WO | WO-2009020281 A1 | 2/2009 |

OTHER PUBLICATIONS

"3rd Generation Partnership Project; Technical Specification Group Services and System Aspects; 3G Security; Security architecture (Release 6)", 3GPP Standard; 3GPP TS 33.102, 3rd Generation Partnership Project (3GPP), Mobile Competence Centre ; 650, Route Des Lucioles ; F-06921 Sophia-Antipolis Cedex ; France, No. V6.2.0, Sep. 1, 2004, pp. 1-62, XP050376414.

3rd Generation Partnership Project; Technical Specification Group Services and System Aspects; 3GPP System Architecture Evolution (SAE) ; Security architecture (Release 9) 3GPP Standard; 3GPP TS 33.401, 3rd Generation Partnersh I P Project (3GPP) , Mobile Competence Centre ; 650, Route Des Lucioles ; F-06921 Sophia-Anti Polis Cedex ; France, No. V9.3.1, 14 Apr. 1, 2010 (Apr. 14, 2010), pp. 1-104, XP050402537, [retrieved on Apr. 14, 2010] pp. 51-54, paragraph 9.2.2, figure 9.2.2.1-1; p. 72, paragraph A.10.

International Search Report and Written Opinion—PCT/US2011/032755—ISA/EPO—Dec. 1, 2012.

Lei Z, et al., "Design of a High Security GSM/UMTS Inter-System", 2009 1st International Conference on Information Science and Engineering (ICISE 2009)—Dec. 26-28, 2009—Nanjing, China, IEEE, Piscataway, NJ, USA, Dec. 26, 2009, pp. 1703-1706, XP031663041, ISBN: 978-1-4244-4909-5.

Qualcomm Incorporated: "Proposal for UTRAN KH solution 2 interworking with E-UTRAN", 3GPP Draft; S3-100855, 3rd Generation Partnership Project (3GPP), Mobile Competence Centre ; 650, Route Des Lucioles ; F-06921 Sophia-Anti Polis Cedex ; France, vol. SA WG3, No. Montreal; 20100702, Jun. 21, 2010, XP050460030, [retrieved on 2010-06-211 paragraphs [5.2.2] , [5.2 .y.4.3].

Universal Mobile Telecommunications System (UMTS); LTE; 3G security; Security architecture (3GPP TS 33.102 version 8.1.0 Release 8); ETSI TS 133 102, Jan. 1, 2009, ETSI Standard, European Telecommunications Standards Institute (ETSI), Sophia Antipolis Cedex, France, XP014043538.

Wang H., et al., "Security context transfer in vertical handover", Personal, Indoor and Mobile Radio Communications, 2003, PIMRC 2003, 14th IEEE Proceedings on Sep. 7-10, 2003, IEEE, Piscataway, NJ, USA, vol. 2, Sep. 7, 2003, pp. 2775-2779, XP010678137, DOI:10.1109/PIMRC.2003.1259248 ISBN: 978-0-7803-7822-3.

Huawei: "START/NAS Count relay on Inter-RAT mobility", S3-090918, 3GPP, May 15, 2009.

Pope M., et al., "Study on the Introduction of Key Hierarchy in UTRAN", S3-091157, 3GPP, May 15, 2009.

Pope M., et al., "Study on the Introduction of Key Hierarchy in Utran", S3-100319, 3GPP, Feb. 14, 2010.

Taiwan Search Report—TW100113219—TIPO—Aug. 12, 2013.

3GPP TS 33.401 V8.1.1 (Oct. 2008). Technical Specification 3rd Generation Partnership Project; Technical Specification Group Services and System Aspects; 3GPP System Architecture Evolution (SAE); Security architecture, pp. 1-54.

* cited by examiner

APPARATUS AND METHOD FOR SIGNALING ENHANCED SECURITY CONTEXT FOR SESSION ENCRYPTION AND INTEGRITY KEYS

CROSS-REFERENCE TO RELATED APPLICATIONS

This application claims the benefit of U.S. Provisional Application No. 61/324,646, filed Apr. 15, 2010, which application is incorporated herein by reference.

This application is related to U.S. Provisional Application No. 61/324,991, filed Apr. 16, 2010, and to U.S. Provisional Application No. 61/325,001, filed Apr. 16, 2010.

BACKGROUND

1. Field

The present invention relates generally to an enhanced security context signaling for user equipment operating in a Universal Mobile Telecommunications Service (UMTS) and/or GSM Edge Radio Access Network (GERAN).

2. Background

A successful AKA (Authentication and Key Agreement) authentication in a UMTS third generation (3G) radio access network or in a GERAN networks using 3G AKA authentication results in a pair of shared keys, a cipher key (CK) and an integrity key (IK), for securing communications between a user equipment (UE) and the network. The shared keys may be used directly to secure the traffic between the UE and the network as in the case of UTRAN (UMTS Terrestrial Radio Access Network), or may be used to statically derive keys, e.g. $K_C$ or $K_{C128}$, in the case of GERAN (GSM Edge Radio Access Network).

A compromised key may result in serious security problems until the keys are changed at a next AKA authentication. Typically, the AKA authentication is not run often due to the significant overhead required. Also, if both keys (CK and IK) are compromised, then the GERAN keys are compromised.

In UMTS/HSPA (High Speed Packet Access) deployments, some or all of functionalities of a radio network controller (RNC) and a Node B may be collapsed together into one node at the edge of the network. The RNC needs the keys for functionalities such as user plane ciphering and signaling plane ciphering and integrity protection. However, the RNC functionality may be deployed in an exposed location such as in a Home Node B in a UMTS Femtocell. Accordingly, RNC functionality deployed in possibly insecure locations providing access (including physical access) may allow the keys, CK and IK, to be compromised.

Session keys (modified version of CK and IK) may be used to lower the security risks associated with exposed RNC functionality. Techniques for providing such session keys are disclosed in U.S. Patent Application Publication No. US 2007/0230707 A1.

Unfortunately, the use of such session keys require upgrade modifications to the serving networks. However, networks operators are likely to upgrade serving networks in a staged manner.

There is therefore a need for a technique for signaling enhanced security context support which is compatible with legacy serving networks.

SUMMARY

An aspect of the present invention may reside in a method for establishing a first security context between a remote station and a serving network. The first security context has a security property that is not supported by a second security context. In the method, the remote station forwards a first message to the serving network, wherein the first message includes an information element signaling that the remote station supports the first security context. The remote station generates at least one session key, in accordance with the first security context, using the information element. The remote station receives, in response to the first message, a second message having an indication that the serving network supports the first security context. The remote station, in response to the second message, has wireless communications protected by the at least one session key.

In more detailed aspects of the invention, the information element may comprise a count value updated for a session. Further, the indication that the serving network supports the first security context may comprise an authentication code generated based on a corresponding at least one session key generated by the serving network using the information element received from the remote station. Also, the remote station may comprise a mobile user equipment.

In other more detailed aspects of the invention, the serving network may be a UMTS serving network. The first security context may be an enhanced UMTS security context, and the second security context may be a legacy UTRAN security context. Alternatively, the serving network may be a GERAN serving network.

Another aspect of the invention may reside in a remote station which may include means for forwarding a first message to a serving network, wherein the first message includes an information element signaling that the remote station supports a first security context, and wherein the first security context has a security property that is not supported by a second security context; means for generating at least one session key, in accordance with the first security context, using the information element; means for receiving, in response to the first message, a second message having an indication that the serving network supports the first security context; and means for having wireless communications, in response to the second message, protected by the at least one session key.

Another aspect of the invention may reside in a remote station which may include a processor configured to: forward a first message to a serving network, wherein the first message includes an information element signaling that the remote station supports a first security context, and wherein the first security context has a security property that is not supported by a second security context; generate at least one session key, in accordance with the first security context, using the information element; receive, in response to the first message, a second message having an indication that the serving network supports the first security context; and have wireless communications, in response to the second message, protected by the at least one session key.

Another aspect of the invention may reside in a computer program product, comprising computer-readable storage medium, comprising code for causing a computer to forward a first message to a serving network, wherein the first message includes an information element signaling that the computer supports a first security context, and wherein the first security context has a security property that is not supported by a second security context; code for causing a computer to generate at least one session key, in accordance with the first security context, using the information element; code for causing a computer to receive, in response to the first message, a second message having an indication that the serving network supports the first security context; and code for causing a computer to have wireless communications, in response to the second message, protected by the at least one session key.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
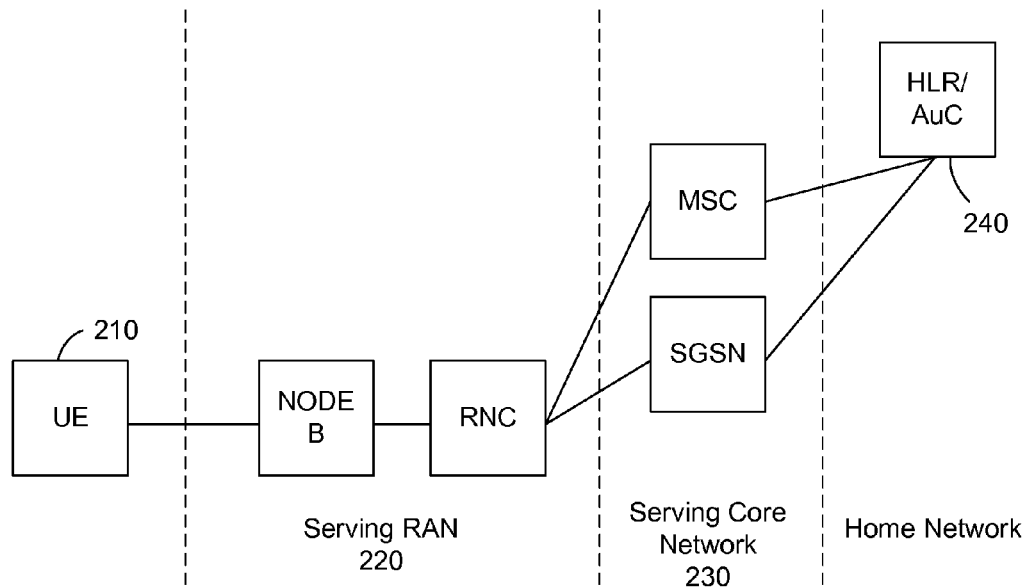
FIG. 2 is a block diagram of an example of a wireless communication system in accordance with a UMTS/UTRAN architecture.
Figure 3:
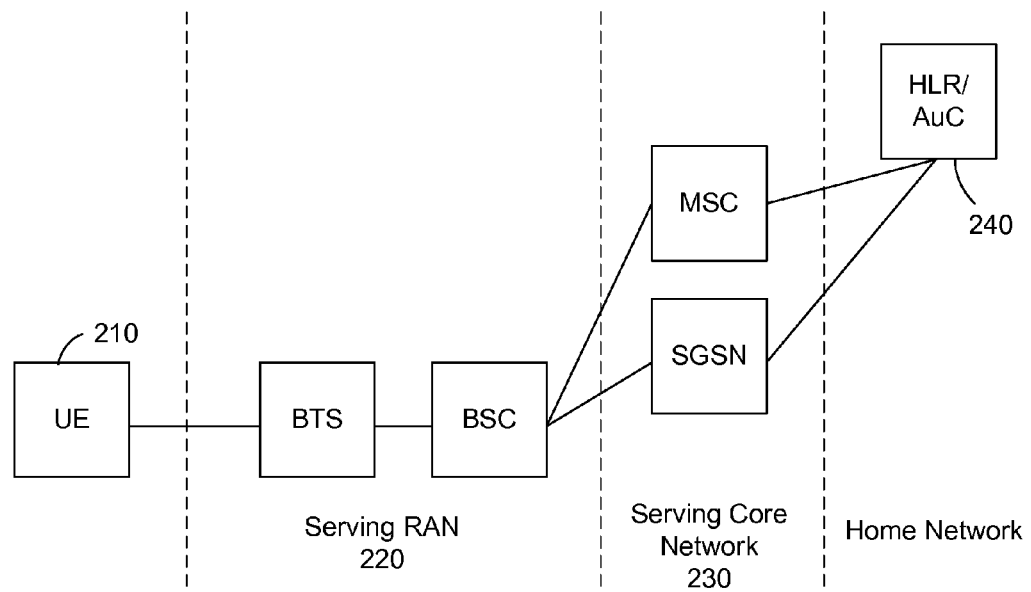
FIG. 3 is a block diagram of an example of a wireless communication system in accordance with a GERAN architecture.
Figure 4:
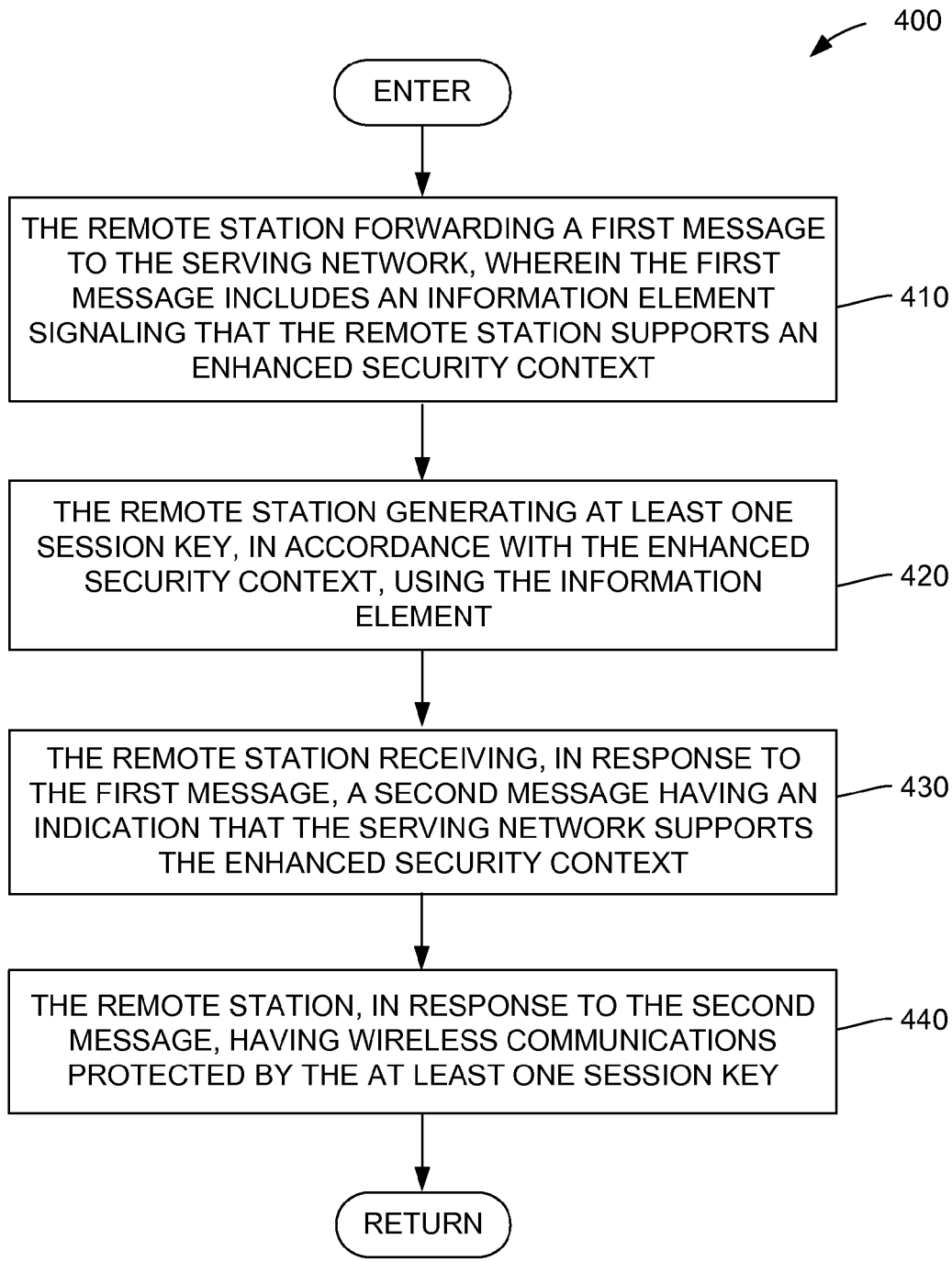
FIG. 4 is a flow diagram of a method for establishing an enhanced security context between a remote station and a serving network.

With reference to FIGS. 2 though 4, an aspect of the present invention may reside in a method 400 for establishing an enhanced security context between a remote station 210 and a serving network 230. In the method, the remote station forwards a first message to the serving network (step 410), wherein the first message includes an information element signaling that the remote station supports an enhanced security context. The remote station generates at least one session key, $CK_S$ and $IK_S$, in accordance with the enhanced security context, using the information element (step 420). The remote station receives, in response to the first message, a second message having an indication that the serving network supports the enhanced security context (step 430). The remote station, in response to the second message, has wireless communications protected by the at least one session key (step 440).

The information element may comprise a count. Further, the indication that the serving network supports the enhanced security context may comprise an authentication code (MAC) generated based on a corresponding at least one session key generated by the serving network 230 using the information element received from the remote station 210. Also, the remote station may comprise a mobile user equipment (UE) such as a wireless device.

Figure 8:
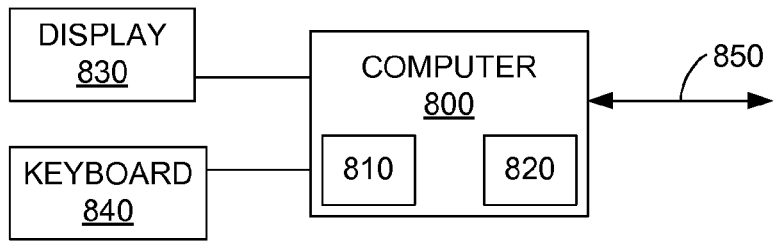
FIG. 8 is a block diagram of a computer including a processor and a memory.

With further reference to FIG. 8, another aspect of the invention may reside in a remote station 210 which may include means (processor 810) for forwarding a first message to a serving network 230, wherein the first message includes an information element signaling that the remote station supports an enhanced security context; means for generating at least one session key, in accordance with the enhanced security context, using the information element; means for receiving, in response to the first message, a second message having an indication that the serving network supports the enhanced security context; and means for having wireless communications, in response to the second message, protected by at least one session key.

Another aspect of the invention may reside in a remote station 210 which may include a processor 810 configured to: forward a first message to a serving network 230, wherein the first message includes an information element signaling that the remote station supports an enhanced security context; generate at least one session key, in accordance with the enhanced security context, using the information element; receive, in response to the first message, a second message having an indication that the serving network supports the enhanced security context; and have wireless communications, in response to the second message, protected by the at least one session key.

Another aspect of the invention may reside in a computer program product, comprising computer-readable storage medium 820, comprising code for causing a computer 800 to forward a first message to a serving network 230, wherein the first message includes an information element signaling that the computer supports an enhanced security context; code for causing a computer to generate at least one session key, in accordance with the enhanced security context, using the information element; code for causing a computer to receive, in response to the first message, a second message having an indication that the serving network supports the enhanced security context; and code for causing a computer to have wireless communications, in response to the second message, protected by the at least one session key.

The serving core network 230 is connected to a serving RAN (Radio Access Network) 220 which provides wireless communications to the remote station 210. In a UMTS/UTRAN architecture, the serving RAN includes a Node B and a RNC (Radio Network Controller). In a GERAN architecture, the serving RAN includes a BTS (Base Transceiver Station) and a BSC (Base Station Controller). The serving core network includes an MSC/VLR (Mobile Switching Center/Visitor Location Register) for providing circuit-switched (CS) service, and an SGSN (Serving GPRS Support Node) for providing packet-switched (PS) services. The home network includes an HLR (Home Location Register) and an AuC (Authentication Center).

The UE 210 and the serving core network 230 may be enhanced with new security properties to create an enhanced UMTS security context (ESC) using a COUNT (counter value). A 256-bit root key ($K_{ASME U}$) for the ESC may be derived from the CK and IK when AKA authentication is performed. The root key may be set equal to CK||IK, or it may be derived using a more complex derivation resulting in additional useful security properties (e.g., CK and IK do not need to be kept). The COUNT may be a 16-bit counter value that is maintained between the UE and the serving core network. (Note: a legacy UTRAN security context consists of KSI (a 3-bit Key Set Identifier), CK (a 128-bit encryption key), and IK (a 128-bit integrity key)).

Figure 5:
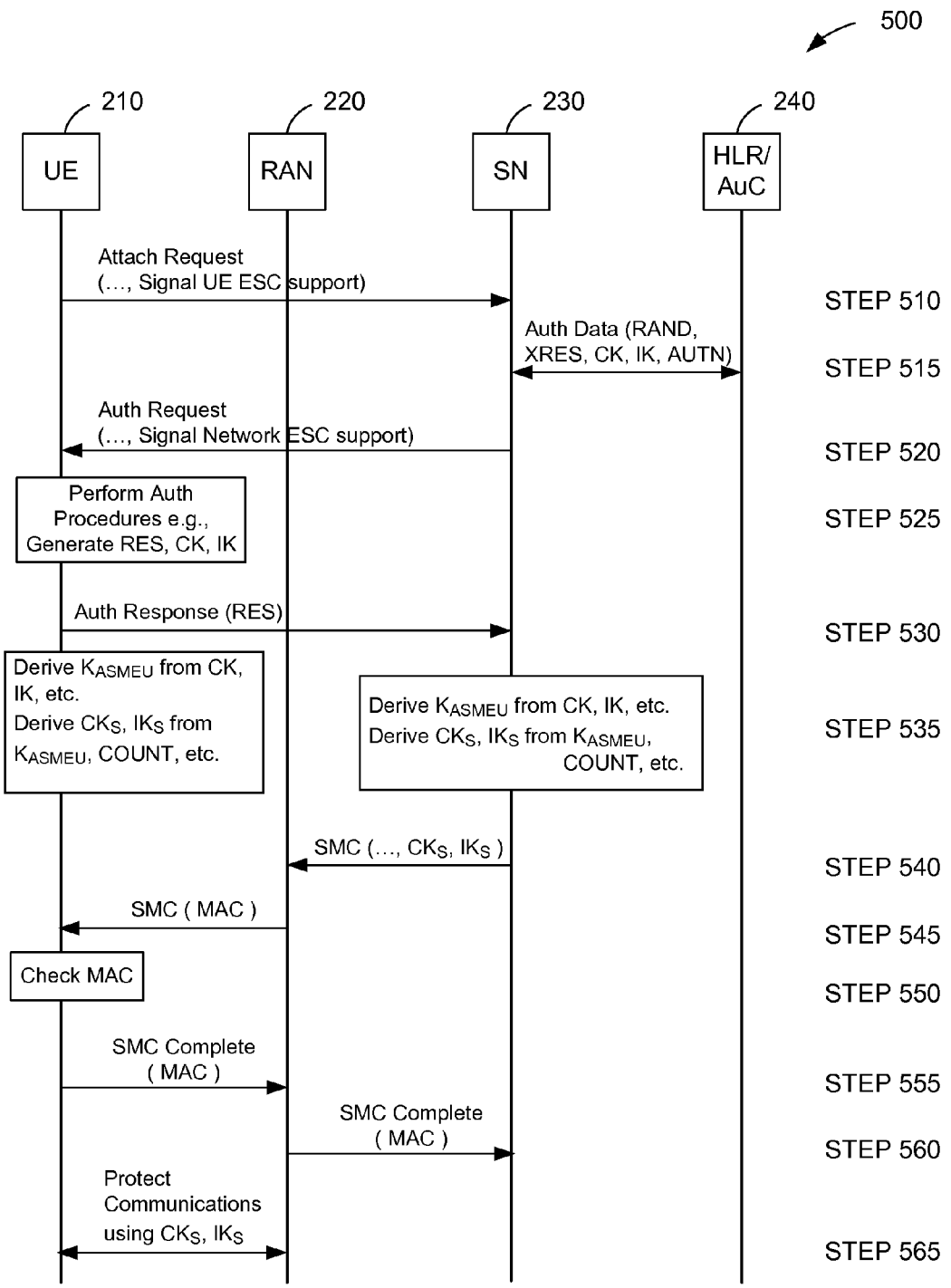
FIG. 5 is a flow diagram of a method for establishing an enhanced security context between a remote station and a serving network based on an attach request message.

With reference to FIG. 5, in a method 500 related to UMTS attach procedures, the UE 210 may signal that it supports ESC in a UMTS attach request message (step 510). The ESC is an example of the first security context. The support signal may be the presence of a new information element (IE) in the message. The IE may comprise the COUNT value. A serving network SN 230 that does not support ESC will ignore the new IE. Not supporting the ESC is an example of the second security context. Authentication data (RAND, XRES, CK, IK, AUTN) is obtained from the HLR/AuC 240 (step 515). The SN may indicate ESC support in the AKA challenge (Authentication Request) to the UE (step 520). The UE performs the authentication procedures (step 525) and returns a response RES to the SN (step 530). Upon successful authentication (step 530), the UE and SN derive the root key $K_{ASMEU}$ and the session keys $CK_S$ and $IK_S$ (step 535). The SN forwards the session keys to the RAN 220 in an SMC (Security Mode Command) message (step 540). The RAN generates a message authentication code (MAC) using the session key $IK_S$, which is forwarded to the UE in an SMC message (step 545). The UE checks the MAC (step 550) using the session key $IK_S$ that the UE derived (step 535), and returns a complete indication to the RAN (step 555), which forwards it to the SN (step 560). The UE is then able to protect communications using the session keys (step 565).

Figure 6:
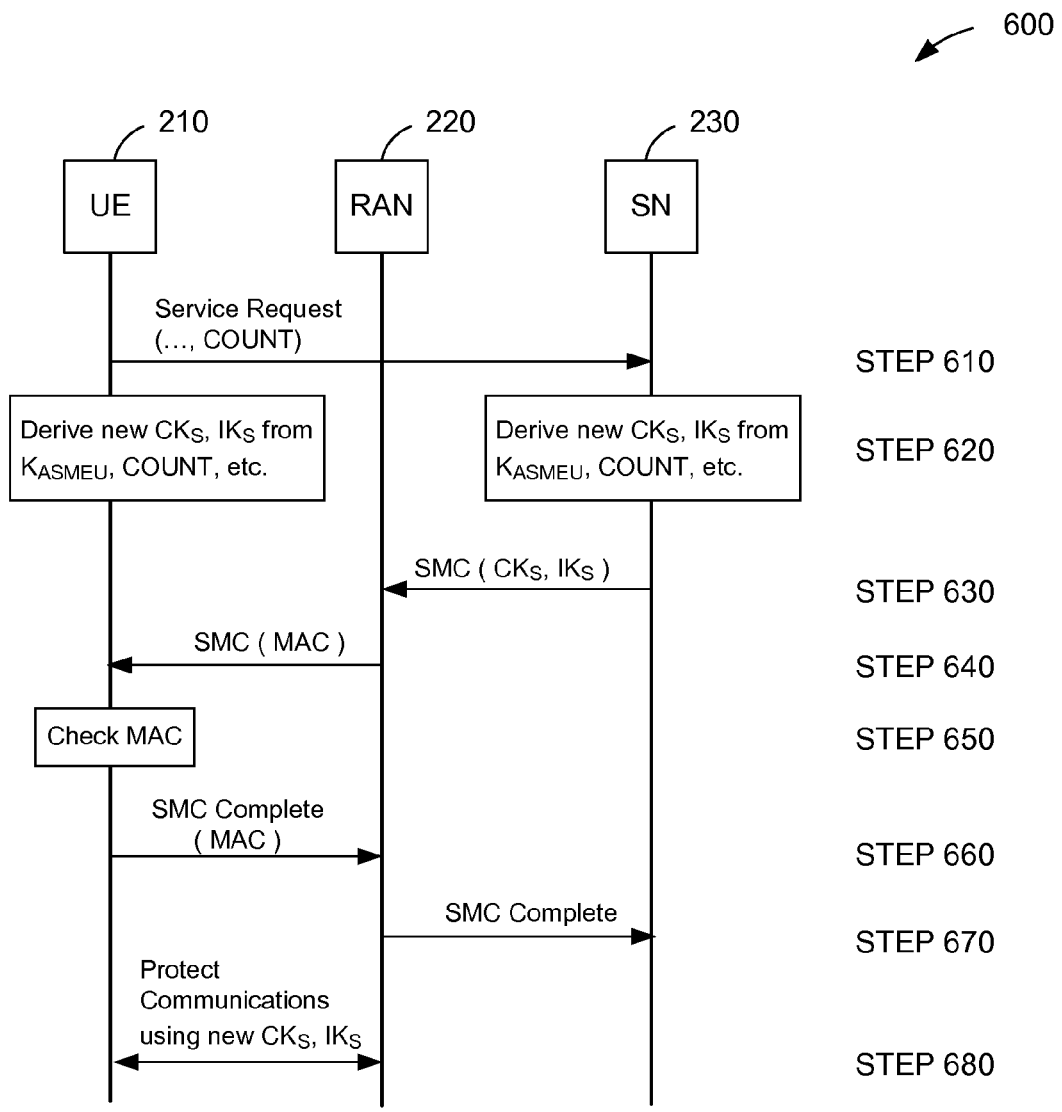
FIG. 6 is a flow diagram of a method for establishing at least one session key from an enhanced security context between a remote station and a serving network based on a service request message.

With reference to FIG. 6, in a method 600 related to an Idle to Active Mode procedure 600, the UE 210 forwards a service request message which includes the COUNT value to the SN 230 (step 610). The UE and SN derive new the session keys $CK_S$ and $IK_S$ from the root key $K_{ASMEU}$ (step 620). The SN forwards the session keys to the RAN 220 in an SMC message (step 630). The RAN generates a MAC, which is forwarded to the UE in an SMC message (step 640). The UE checks the MAC (step 650), and returns a complete indication to the RAN (step 660), which forwards it to the SN (step 670). The UE is then able to protect communications using the session keys (step 680).

Figure 7:
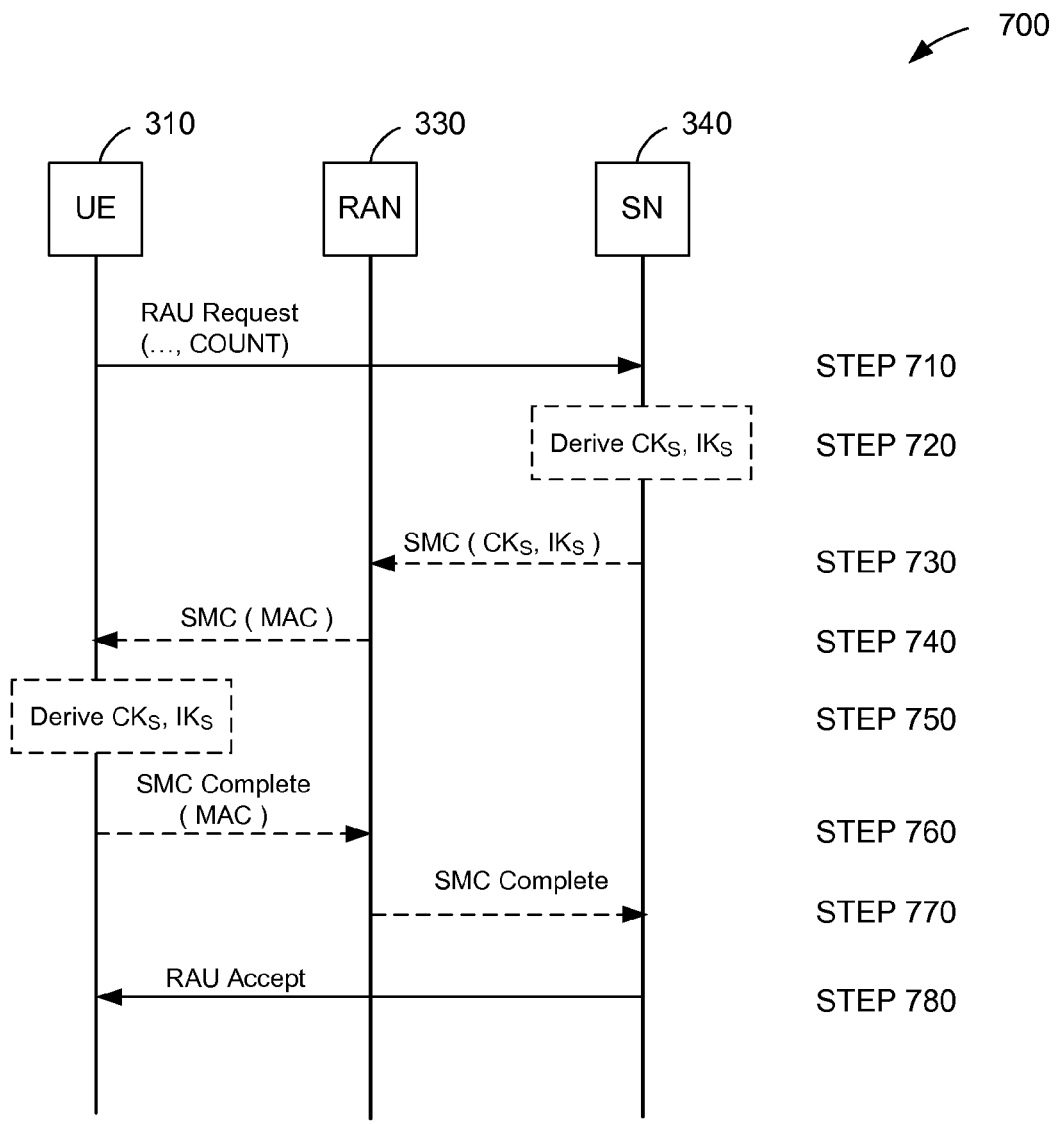
FIG. 7 is a flow diagram of a method for establishing at least one session key from an enhanced security context between a remote station and a serving network based on a routing area update request message.

With reference to FIG. 7, in a method 700 related to mobility management procedures 700 (such as a Routing Area Update (RAU) or Location Area Update (LAU), the UE 210 forwards a RAU (or LAU) request message which includes the COUNT value to the SN 230 (step 710). Optionally, the UE and SN may derive new the session keys $CK_S$ and $IK_S$ from the root key $K_{ASMEU}$ (step 720) The SN may forward the session keys to the RAN 220 in an SMC message (step 730). The RAN may generate a MAC, which may be forwarded to the UE in an SMC message (step 740). The UE may check the MAC (step 750), and may return a complete indication to the RAN (step 760), which forwards it to the SN (step 770). The SN then sends a RAU accept message to the UE (step 780). The UE is then able to protect communications using the session keys.

New access stratum (AS) keys may be generated for each transition from Idle to Active State. Similarly, keys may be generated at other events. The COUNT value may be sent in idle mobility messages and in initial layer 3 messages, e.g., Attaches, RAUs, LAUs, for idle, mobility, or service request. The SN may check that the sent COUNT value has not been used before, and updates the stored COUNT value in the process. If the COUNT value is new (e.g., received COUNT value>stored COUNT value), the UE and the SN proceed to calculate the new key $CK_S$ and $IK_S$, using a Key Derivation Function (KDF) such as HMAC-SHA256, from the root key $K_{ASMEU}$ and the sent COUNT value. The KDF may include additional information, such as RAN node identity, for the new key calculation. If the check fails (the COUNT value is not new), the SN rejects the message. For GERAN usage, when $K_C$ and $K_{C128}$ are calculated from $CK_S$ and $IK_S$, it may be done in the same manner as when calculated from CK and IK.

The session keys ($CK_S$ and $IK_S$) may have a lifetime such that the UE and the serving network keep and use the session keys until either it is no longer necessary to store the keys to send traffic securely between the UE and the network (UE moves to Idle mode), or a new context is created at a subsequent event (e.g., AKA authentication or a mobility event).

The remote station 210 may comprise a computer 800 that includes a storage medium 820 such as memory, a display 830, and an input device 840 such as a keyboard. The apparatus may include a wireless connection 850.

Figure 1:
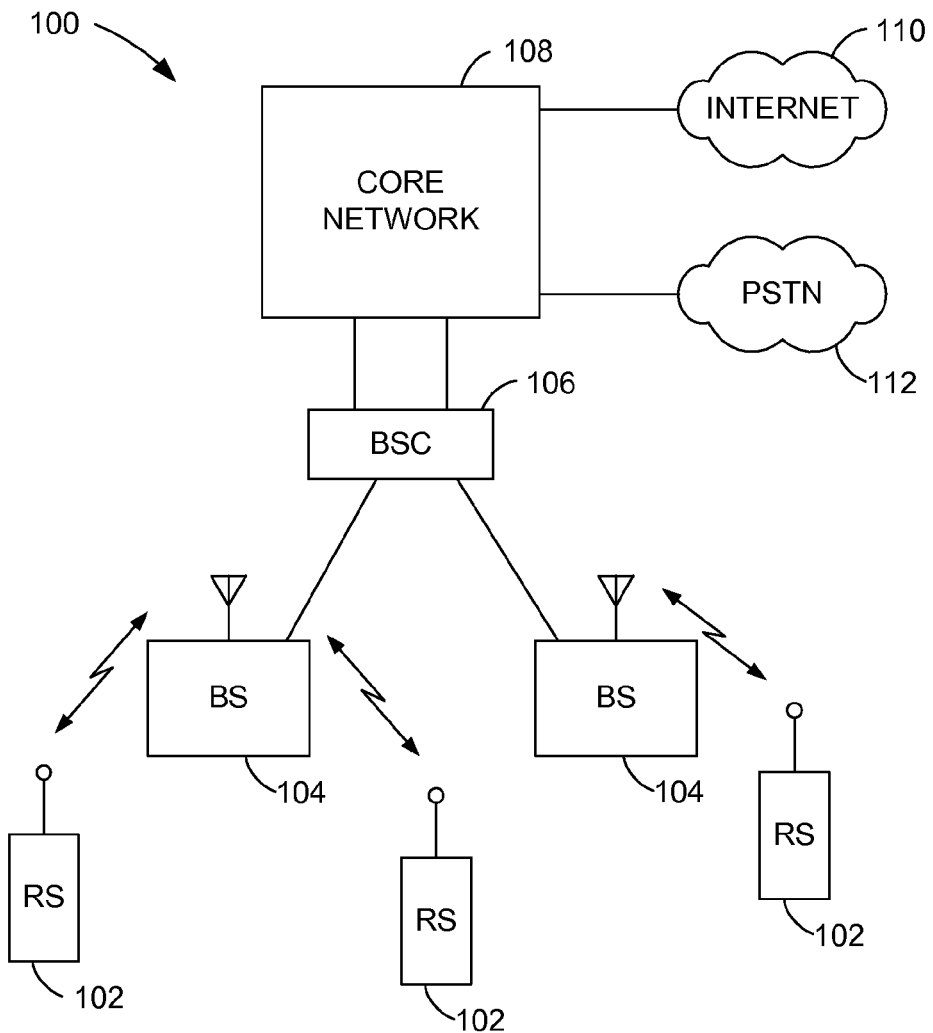
FIG. 1 is a block diagram of an example of a wireless communication system.

With reference to FIG. 1, a wireless remote station (RS) 102 (or UE) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device 102 may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for establishing a first security context between a remote station and a serving network, the first security context having a security property that is not supported by a second security context, the method comprising:
    forwarding, by the remote station, a first message to the serving network, wherein the remote station supports secure wireless communications using either the first security context or the second security context, the first message includes an information element signaling that the remote station supports the first security context, and the second security context provides secure wireless communications without supporting use of the information element;
    generating, by the remote station, a session integrity key and a session cipher key, in accordance with the first security context, using the information element;
    receiving, by the remote station in response to the first message, a second message having a message authentication code that indicates the serving network supports the first security context for secure wireless communications with the remote station, which first security context includes use of the information element not supported by the second security context;
checking, by the remote station, the message authentication code using the session integrity key; and
in response to successfully checking the message authentication code, having, by the remote station, wireless communications protected by the session cipher key.

2. The method of claim 1, wherein the information element comprises a count value updated for a session.

3. The method of claim 1, wherein the serving network is a UMTS serving network.

4. The method of claim 3, wherein the first security context is an enhanced UMTS security context, and the second security context is a legacy UTRAN security context.

5. The method of claim 1, wherein the serving network is a GERAN serving network.

6. The method of claim 1, wherein an indication that the serving network supports the first security context comprises the authentication code generated based on a corresponding session integrity key generated by the serving network using the information element received from the remote station.

7. The method of claim 1, wherein the remote station comprises a mobile user equipment.

8. A remote station, comprising:
means for forwarding a first message to a serving network, wherein the remote station supports secure wireless communications using either a first security context or a second security context, the first message includes an information element signaling that the remote station supports the first security context, and the second security context provides secure wireless communications without supporting use of the information element;
means for generating a session integrity key and a session cipher key, in accordance with the first security context, using the information element;
means for receiving, in response to the first message, a second message having a message authentication code that indicates the serving network supports the first security context for secure wireless communications with the remote station, which first security context includes use of the information element not supported by the second security context;
means for checking the message authentication code using the session integrity key; and
means for having wireless communications, in response to successfully checking the message authentication code, protected by the session cipher key.

9. The remote station of claim 8, wherein the information element comprises a count value updated for a session.

10. The remote station of claim 8, wherein the serving network is a UMTS serving network.

11. The remote station of claim 10, wherein the first security context is an enhanced UMTS security context, and the second security context is a legacy UTRAN security context.

12. The remote station of claim 8, wherein the serving network is a GERAN serving network.

13. The remote station of claim 8, wherein an indication that the serving network supports the first security context comprises the authentication code generated based on a corresponding session integrity key generated by the serving network using the information element received from the remote station.

14. The remote station of claim 8, wherein the remote station comprises a mobile user equipment.

15. A remote station, comprising:
a processor configured to:
forward a first message to a serving network, wherein the remote station supports secure wireless communications using either a first security context or a second security context, the first message includes an information element signaling that the remote station supports the first security context, and the second security context provides secure wireless communications without supporting use of the information element;
generate a session integrity key and a session cipher key, in accordance with the first security context, using the information element;
receive, in response to the first message, a second message having a message authentication code that indicates the serving network supports the first security context for secure wireless communications with the remote station, which first security context includes use of the information element not supported by the second security context;
check the message authentication code using the session integrity key; and
have wireless communications, in response to a successful check of the message authentication code, protected by the session cipher key.

16. The remote station of claim 15, wherein the information element comprises a count value updated for a session.

17. The remote station of claim 15, wherein the serving network is a UMTS serving network.

18. The remote station of claim 17, wherein the first security context is an enhanced UMTS security context, and the second security context is a legacy UTRAN security context.

19. The remote station of claim 15, wherein the serving network is a GERAN serving network.

20. The remote station of claim 15, wherein an indication that the serving network supports the first security context comprises the authentication code generated based on a corresponding session integrity key generated by the serving network using the information element received from the remote station.

21. The remote station of claim 15, wherein the remote station comprises a mobile user equipment.

22. A computer program product, comprising:
non-transitory computer-readable medium, comprising:
code for causing a computer to forward a first message to a serving network, wherein the computer supports secure wireless communications using either a first security context or a second security context, the first message includes an information element signaling that the computer supports the first security context, and the second security context provides secure wireless communications without supporting use of the information element;
code for causing a computer to generate a session integrity key and a session cipher key, in accordance with the first security context, using the information element;
code for causing a computer to receive, in response to the first message, a second message having a message authentication code that indicates the serving network supports the first security context for secure wireless communications with the remote station, which first security context includes use of the information element not supported by the second security context;
code for causing a computer to check the message authentication code using the session integrity key; and code for causing a computer to have wireless communications, in response to a successful check of the message authentication code, protected by the session cipher key.

23. The computer program product of claim 22, wherein the information element comprises a count value updated for a session.

24. The computer program product of claim 22, wherein the serving network is a UMTS serving network.

25. The computer program product of claim 24, wherein the first security context is an enhanced UMTS security context, and the second security context is a legacy UTRAN security context.

26. The computer program product of claim 22, wherein the serving network is a GERAN serving network.

27. The computer program product of claim 22, wherein an indication that the serving network supports the first security context comprises the authentication code generated based on a corresponding session integrity key generated by the serving network using the received information element.

28. The computer program product of claim 22, wherein the session integrity key and the session cipher key are calculated from the information element and a root key.

29. The method of claim 1, wherein the session integrity key and the session cipher key are calculated from the information element and a root key.

30. The remote station of claim 8, wherein the session integrity key and the session cipher key are calculated from the information element and a root key.

31. The remote station of claim 15, wherein the session integrity key and the session cipher key are calculated from the information element and a root key.

* * * * *